United States Patent [19]

Freshman, Jr.

[11] Patent Number: 4,603,369

[45] Date of Patent: Jul. 29, 1986

[54] LOW VOLTAGE BURIED WIRE ISOLATOR

[76] Inventor: Robert M. Freshman, Jr., 1111 Terrace, Nebraska City, Nebr. 68410

[21] Appl. No.: 612,635

[22] Filed: May 21, 1984

[51] Int. Cl.$^4$ .............................................. H02H 1/04
[52] U.S. Cl. .................... 361/119; 361/111; 174/78
[58] Field of Search .............. 361/119, 117, 111, 112; 339/14 L; 174/78; 179/78 A

[56] References Cited

U.S. PATENT DOCUMENTS

| | | | |
|---|---|---|---|
| 2,959,633 | 11/1960 | Palmer | 174/50 |
| 3,033,913 | 5/1962 | Dietze | 174/50 |
| 3,168,613 | 2/1965 | Palmer | 174/50 |
| 3,568,128 | 3/1971 | Taylor | 339/14 |
| 4,264,940 | 4/1981 | Castle | 361/91 |

FOREIGN PATENT DOCUMENTS 0985952 12/1982 U.S.S.R. ............... 361/119

Primary Examiner—A. D. Pellinen
Assistant Examiner—Jeffrey A. Gaffin
Attorney, Agent, or Firm—Zarley, McKee, Thomte, Voorhees & Sease

[57] ABSTRACT

A low voltage buried wire isolator for interrupting the metallic path between the common grounding system in a structure and the positive grounding system of the telephone or television cable grounding systems. The isolator comprises a housing having an electrically conductive clamping assembly clamped to the metal ground sheath of the service cable. A high voltage protector such as a gas tube is electrically connected, at one of its ends, to the clamping assembly and is designed to normally prevent the flow of electrical current therethrough which is below a predetermined value. A metal fitting is connected to the other end of the high voltage protector and has an electrically conductive wire secured thereto which extends to the existing cable protective apparatus. If a power crossover should occur, the high voltage protector prevents the metal ground sheath from overheating since it is electrically insulated from the cable protective apparatus.

3 Claims, 6 Drawing Figures

LOW VOLTAGE BURIED WIRE ISOLATOR

BACKGROUND OF THE INVENTION

This invention relates to a low voltage buried wire isolator and more particularly to an isolator designed to eliminate a potential fire hazard in telephone and television cable wiring.

In most dwellings, cable television wires, telephone wires, and electrical power wires are mutually grounded to a metal water pipe. The problem associated with the mutual grounding of the television, telephone and electrical wires is that the same provides a zero potential difference for returning electricity to ground. In the event of a power crossover from any of the utilities, the current resulting from the same can damage the telephone or cable television equipment. The power crossover can also cause overheating of the metal sheath surrounding the wire which can lead to spontaneous combustion of the material in contact with the metal sheath. Such combustion can cause severe damage to the area surrounding the cable.

This condition, power seeking a ground through the telephone or television cable service wire sheaths, will occur in the event of a disruption and/or absence of electrical power bonding of the neutral/ground service link from the structure to the power feed or anywhere within the power feed gradient.

It is therefore a principal object of the invention to provide a low voltage buried wire isolator.

A further object of the invention is to provide a low voltage buried wire isolator which interrupts the metallic path presently existing between the common grounding system used in and around structures and the positive grounding system of the telephone and television cable grounding systems.

A further object of the invention is to provide a low voltage buried wire isolator which may be easily installed in existing structures having telephone or television cables extending thereinto.

Yet another object of the invention is to provide a low voltage buried wire isolator including a high voltage protector means therein designed to normally prevent the flow of electrical current therethrough which is below a predetermined value.

Yet another object of the invention is to provide a low voltage buried wire isolator which is economical of manufacture and durable in use.

These and other objects will be apparent to those skilled in the art.

SUMMARY OF THE INVENTION

A low voltage buried wire isolator is provided for interrupting the metallic path presently occurring between the common grounding system used around structures and the positive grounding system of the telephone and television cable grounding systems. The isolator includes a housing having an electrically conductive clamping assembly which is clamped to the metal ground sheath of the cable. One end of a high voltage protector means such as a gas tube or carbon protector is electrically connected to the clamping assembly and is designed to normally prevent the flow of electrical current, below a predetermined value, therethrough. A metal fitting is connected to the other end of the high voltage protector means and has an electrically conductive wire means extending therefrom for connection to the cable protective apparatus normally provided in association with the cable extending into the dwelling. In the event of a power crossover, amperage is prevented from flowing into the metal sheath of the service wire or cable by means of the gas tube or carbon protector.

DESCRIPTION OF THE PREFERRED EMBODIMENT

Figure 1:
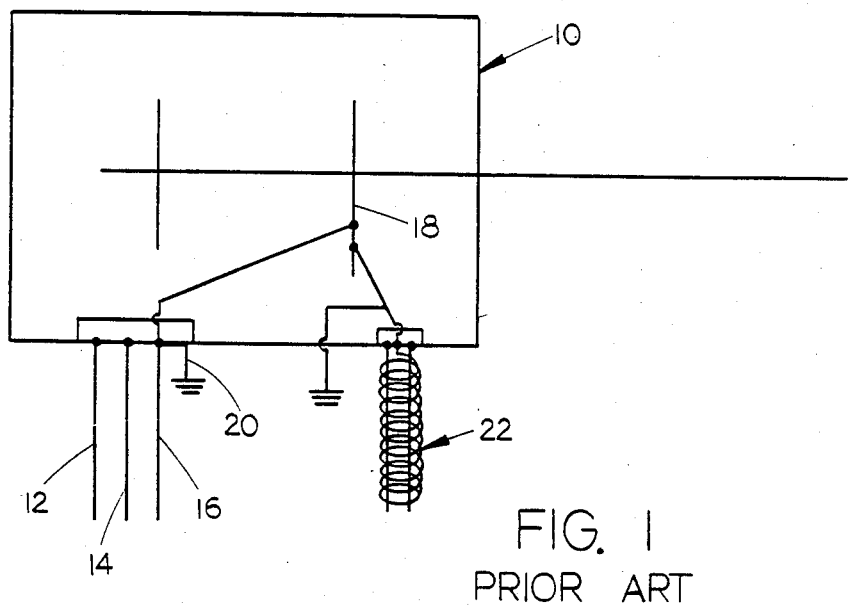
FIG. 1 is a schematic view illustrating the prior art grounding system of a structure having a telephone cable extending thereinto.

FIG. 1 is a schematic view of the typical grounding system in a dwelling or structure 10. The power lines 12, 14 and 16 enter the house in conventional fashion with the ground wire 16 being grounded to a water pipe 18. Normally, the ground wire 16 may also be connected to a grounding rod 20 which is placed in the earth adjacent the dwelling.

Figure 2:
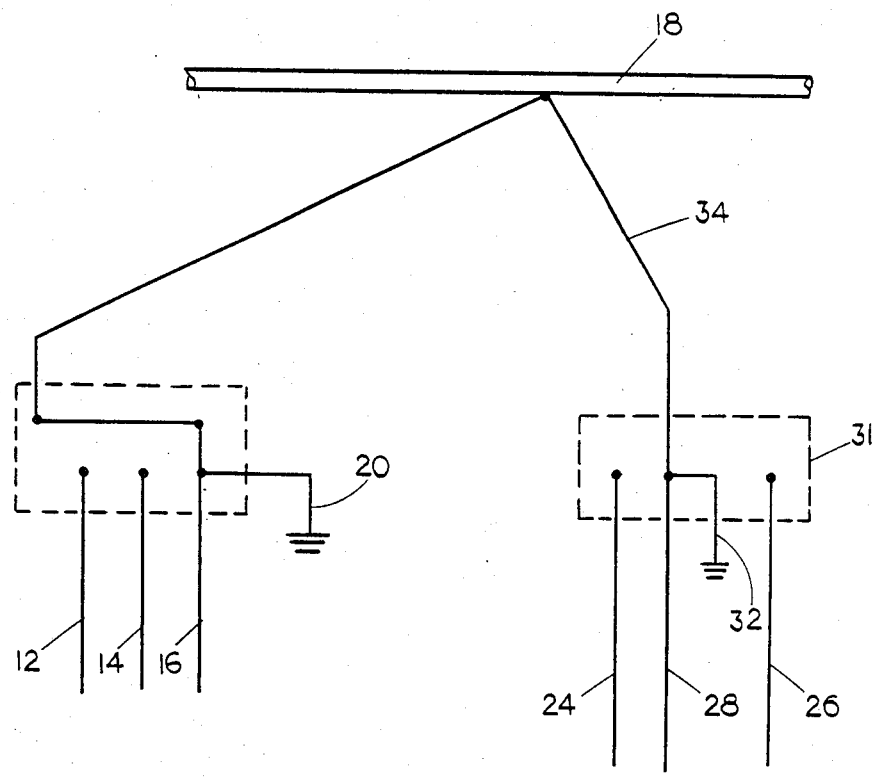
FIG. 2 is an enlarged schematic of the prior art grounding system of FIG. 1.
Figure 3:
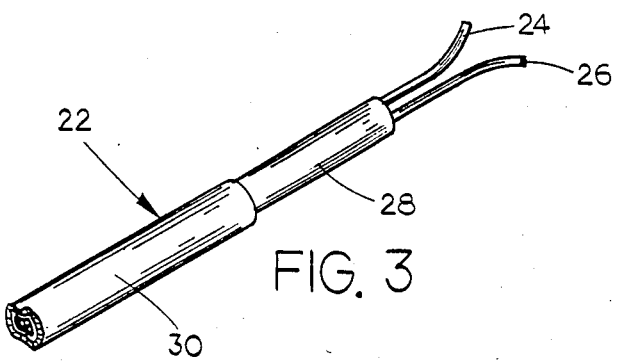
FIG. 3 is a partial perspective view of a service wire.

The numeral 22 refers to a service wire such as a telephone wire or television cable which enters the dwelling as viewed in FIG. 1. For purposes of description, the service wire 22 will be described as being a telephone service wire including conductor wires 24 and 26 surrounded by a metal sheath 28 and an insulation covering material 30, as shown in FIG. 3. Sheath 28 forms the ground for the service wire and the wires 24 and 26 as well as the sheath 28 are normally connected to a lightning protector 31. Sheath 28 may also be connected to a grounding rod 32 as desired. As seen in FIG. 2, the metal sheath 28 is electrically connected to the water pipe 18 by means of lead 34.

Figure 5:
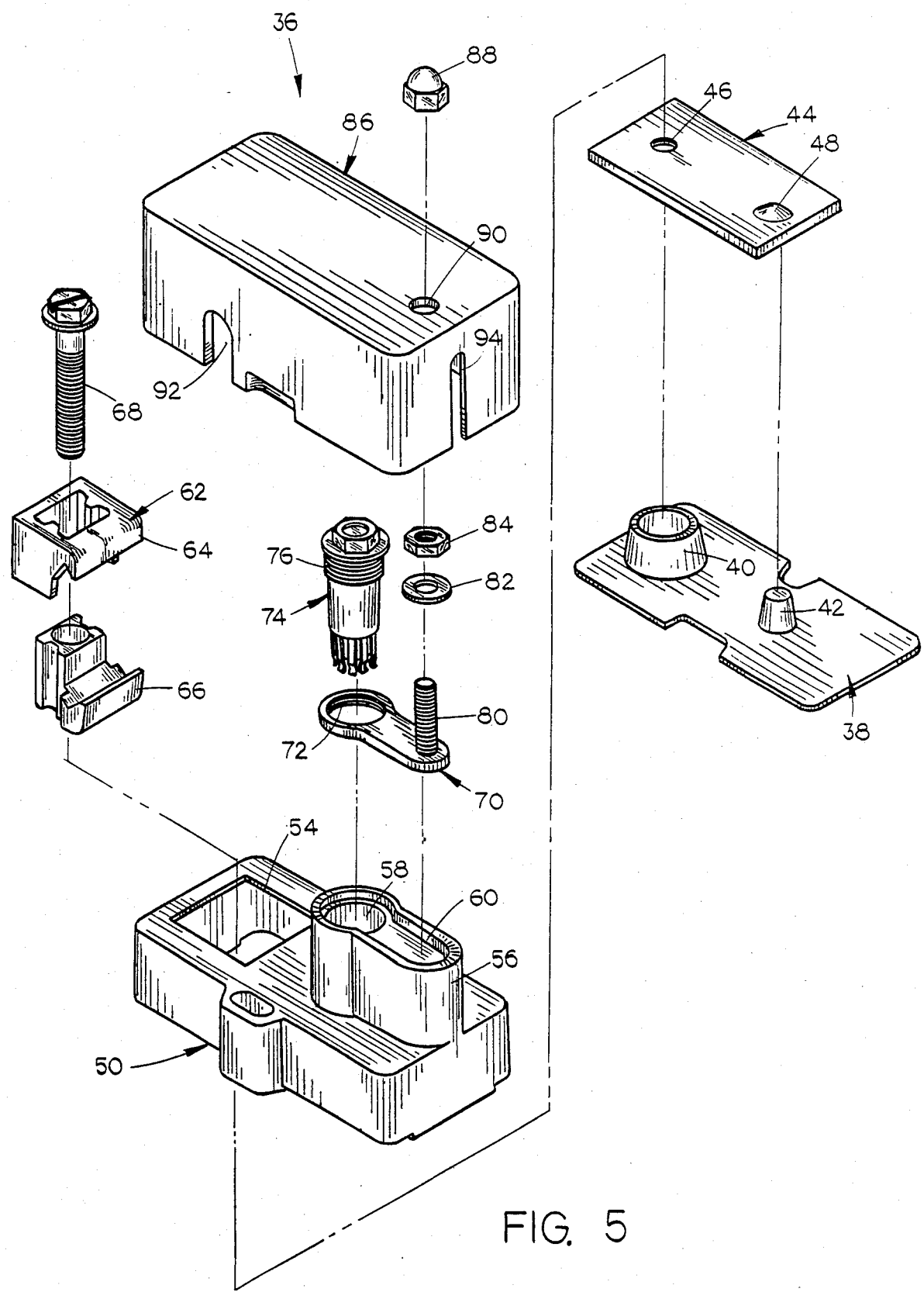
FIG. 5 is an exploded perspective view of the low voltage buried wire isolator of this invention.

In the event that ground should be lost through the water pipe 18 or if there is a power crossover for some other reason, high amperage current will pass through lead 34 into the metal sheath 28. The high amperage current passing into sheath 28 can cause overheating of the sheath and cause spontaneous combustion of the area surrounding the sheath or the material surrounding the sheath. It is the connection of the metal sheath 28 to the protector 31 that applicant desires to eliminate and thus has provided the low voltage buried wire isolator 36 best seen in FIGS. 5 and 6.

Isolator 36 includes a non-electrically conductive base plate 38 having a hollow boss 40 extending upwardly from one end thereof and a solid boss 42 extending upwardly therefrom inwardly of the other end thereof. A metallic bonding clip conductor plate 44 is positioned on the bosses 40 and 42 so that the threaded opening 46 is positioned over the boss 40 and so that the indented portion 48 is positioned over boss 42.

Figure 6:
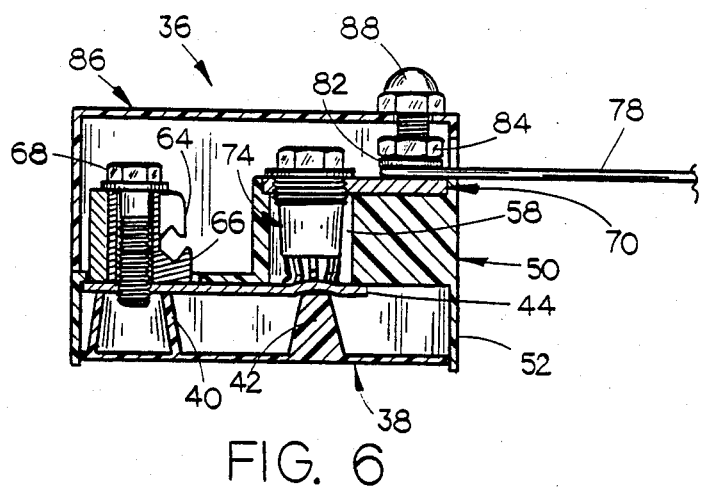
FIG. 6 is a sectional view of the isolator of FIG. 5.

Base 50 embraces plate 44 and plate 38 as seen in FIG. 6. The lower ends of skirt portion 52 of base 50 are heat sealed or otherwise bonded to the periphery of base plate 38 in conventional fashion. As seen in the drawings, base 50 includes an opening 54 formed therein and an upstanding support 56. Support 56 is provided with an opening 58 which extends downwardly therethrough. Support 56 also includes a recessed portion 60.

Bonding clip assembly 62 comprised of clip 64, clip 66 and bolt 68 are provided. The lower portion of clip 66 rests on plate 44 in opening 54 so as to be in electrical contact therewith. The cable 22 is positioned between the clips 64 and 66 and a portion of the insulation material 30 is cut away to expose the metallic sheath 28 so that the sheath 28 will be in electrical contact with the bonding clip assembly 62. Bolt 68 extends downwardly through clips 64 and 66 and is threadably received by threaded opening 46 to positively maintain the cable 22 between the clips 64 and 66 and to positively maintain the bonding clip assembly 62 in electrical contact with the conductor plate 44.

Figure 4:
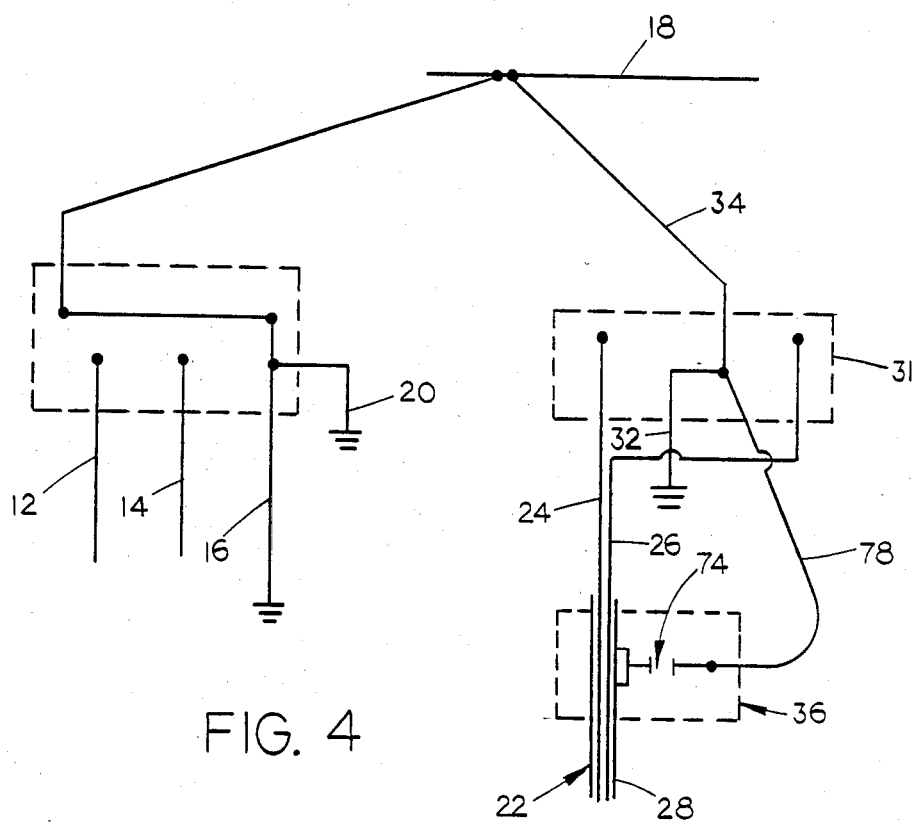
FIG. 4 is a schematic view illustrating the low voltage buried wire isolator of this invention connected to the grounding system of a dwelling.

Tube mounting and ground stud assembly 70 is positioned in the recessed portion 60 of support 56 so that threaded opening 72 is positioned over opening 58. A gas tube or carbon protector 74 has its electrically conductive upper end 76 threadably received by opening 72 as seen in the drawings. Gas tube 74 is of conventional design and preferably prevents the flow of current therethrough below a predetermined level. As seen in the drawings, the lower end of the gas tube 74 is in electrical contact with the indented portion 48 of conductor plate 44. Preferably, tube mounting and ground stud assembly 70 is maintained in the recessed portion 60 by suitable cement or the like. An electrically insulated wire 78 is connected to stud 80 of the assembly 70 and maintained in contact therewith by means of washer 82 and nut 84. Wire 78 is connected to the wire 34 within the protector 31 as seen in FIG. 4. Cover 86 is provided on the isolator and is held in position by means of nut 88 threadably secured to the upper end of stud 80 which extends through opening 90 and cover 86. Cover 86 is provided with a cable entrance opening 92 at one side thereof through which the cable extends. An opening identical to opening 92 is also provided in the cover, opposite to opening 92, to permit the cable to exit from the cover. Opening 94 is provided at one end of the cover 86 to provide an opening for the wire 78 to extend.

When installed in the system as illustrated in FIG. 4, the metal sheath 28 is isolated from the protector 31. If a power crossover should occur, current traveling in wire 34 cannot come into contact with the sheath 28 due to the gas tube or carbon protector 74 being imposed therebetween. With tube 74 being present, the current flowing in wire 34 will go to ground by means of the grounding cable 32. In the event that a sufficiently large current should occur in wire 34 such as would occur with a lightning strike or the like, the gas tube 74 will fire and will permit the momentary passage of current therethrough.

Thus it can be seen that a novel low voltage buried wire isolator has been provided which will prevent spontaneous combustion of the material surrounding the metallic sheath 28 or the area near the sheath by isolating the sheath from the protector 31. The isolator is easily adaptable to the existing grounding system of a dwelling. Thus it can be seen that the low voltage buried wire isolator of this invention accomplishes at least all of its stated objectives.

I claim:

1. A low voltage isolator in combination with a cable protective apparatus, the cable protective apparatus being of the type including a buried cable having a metal grounding sheath surrounding conductor wires therein, and including the common gounding system in a structure and the positive grounding system of the buried cable, said isolator comprising:

a housing, including an electrically conductive clamping assembly clamped to the metal grounding sheath, the sheath being electrically connected to the positive grounding system of the buried cable, a high voltage protector means operatively electrically connected, at one of its ends, to said clamping assembly and adapted to normally prevent the flow of electrical current therethrough which is below a predetermined value, an electrically conductive fitting connected to the other end of said high voltage protector means, and an electrically conductive wire means extending from said metal fitting for connection to the common grounding system in the structure.

2. A low voltage isolator for a buried cable serving a structure comprising, a buried cable serving a structure of the type including a metal grounding sheath surrounding conductor wires, the metal sheath being grounded at one end through the positive grounding system of the buried cable, a housing having an electrically conductive clamping means electrically connected to the metal grounding sheath, a high voltage protector means operatively electrically connected to said clamping means and adapted to normally prevent the flow of electrical current therethrough which is below a predetermined value, and an electrically conductive wire means operatively connected to said high voltage protector means for connection to a common grounding system of a structure.

3. A low voltage isolator in combination with a cable system having a positive grounding system, comprising:

a cable having a metal grounding sheath surrounding insulated conductor wires therein, said cable serving a structure having a common grounding system and the sheath of said cable being grounded at one end through the positive grounding system of said cable system;

a housing having an electrically conductive clamping means electrically connected to the other end of said sheath, a high voltage protector means operatively electrically connected, at one end, to said clamping means and adapted to normally prevent the flow of electrical current therethrough which is below a predetermined valve, and an electrically conductive wire means having one end electrically connected to the other end of said high voltage protector means, the other end of said wire means being electrically connected to the common ground grounding system of said structure.

* * * * *